United States Patent
Schultz et al.

[11] 3,717,319
[45] Feb. 20, 1973

[54] WIRE-FORM CABLE GUIDE FOR SHELF-MOUNTED ELECTRONIC EQUIPMENT MODULES

[75] Inventors: William James Schultz, Lynnfield; Warren Norman Kernander, Boxford, both of Mass.

[73] Assignee: General Electric Co.

[22] Filed: Nov. 27, 1970

[21] Appl. No.: 93,124

[52] U.S. Cl. .....................248/49, 248/51, 312/223, 312/271
[51] Int. Cl. .............................................H02g 11/00
[58] Field of Search.................248/49, 51, 42, 68, 88; 312/223, 271, 320, 209

[56] References Cited

UNITED STATES PATENTS

| | | |
|---|---|---|
| 3,399,909 | 9/1968 | Ambrose ...........................248/68 R |
| 1,644,661 | 10/1927 | Aufenast ...............................248/51 |
| 3,120,411 | 2/1964 | Strumpell ..........................248/49 X |
| 2,887,288 | 5/1959 | Buxbaum ..............................248/88 |
| 1,363,967 | 12/1920 | Fulton ..............................248/88 X |

Primary Examiner—Roy D. Frazier
Assistant Examiner—Rodney H. Bonck
Attorney—William S. Wolfe, Frank L. Neuhauser, Oscar B. Waddell and Joseph B. Forman

[57] ABSTRACT

A generally U-shaped wire-form cable guide having its legs pivotally connected to a module-supporting tray for rotation about an axis perpendicular to the direction in which the module may be moved. The guide includes an opening encircled by the bight portion and by inwardly crimped portions in each of the legs. A flexible electrical cable secured to the module and to the tray passes through this opening.

4 Claims, 4 Drawing Figures

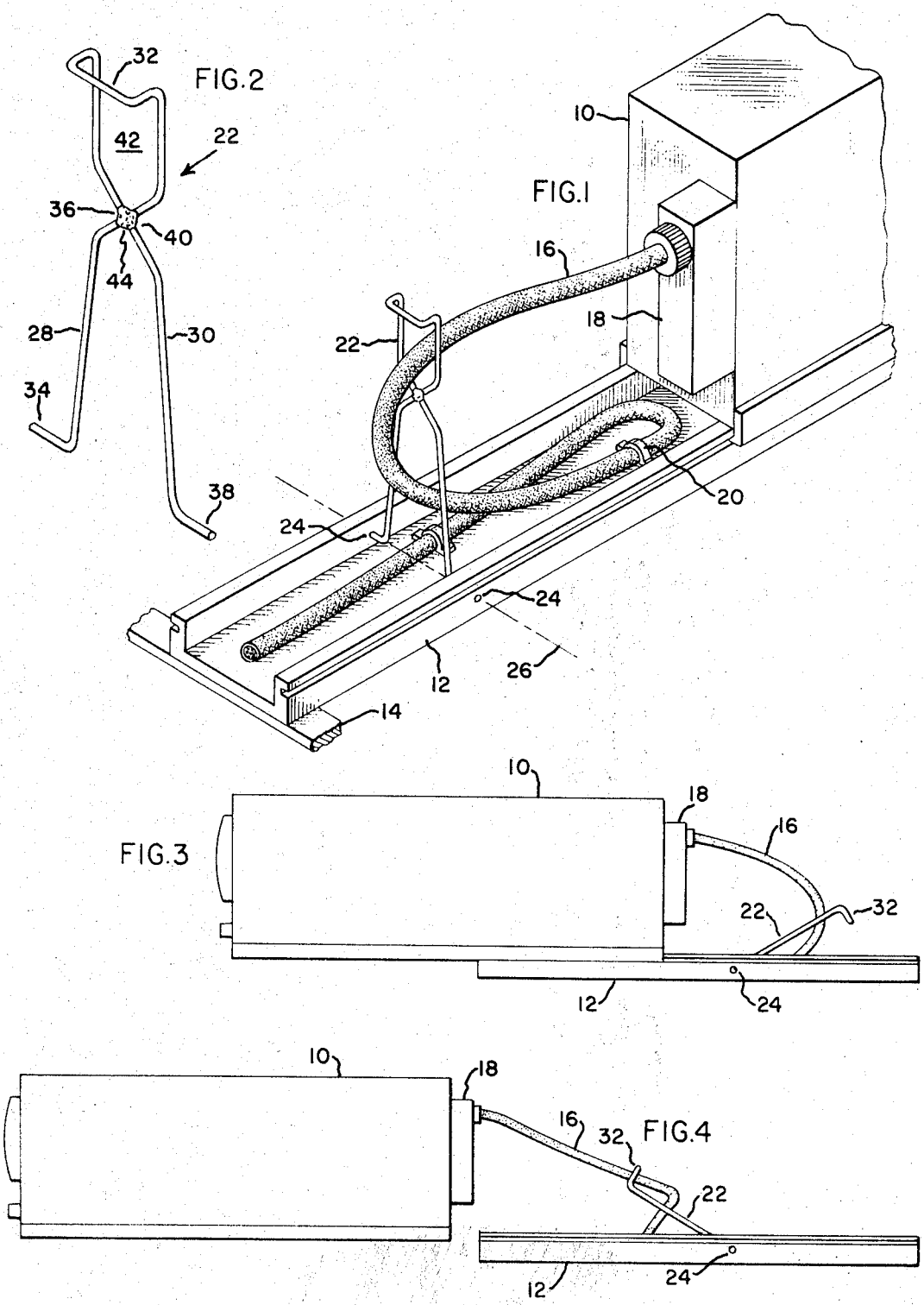

WIRE-FORM CABLE GUIDE FOR SHELF-MOUNTED ELECTRONIC EQUIPMENT MODULES

BACKGROUND OF THE INVENTION

The present invention relates to shelf-mounted electronic equipment modules and more particularly to a cable guide for limiting cable movement when such modules are withdrawn from or inserted into the shelf.

Process instruments used for monitoring and controlling industrial processes are usually modular in form; i.e., each process instrument is contained in a standardized casing or module which permits it to be mounted interchangeably with other process instruments in a multi-module panel. In what is referred to as a shelf-mounted system, each module is electrically connected to the remainder of the system through a flexible electrical cable connected to the rear of the module.

Since the flexible cable must be relatively long to permit withdrawal of the module from the shelf, cables in some prior art systems frequently tend to hang up on adjoining modules, making it more difficult to withdraw or insert the modules and causing considerable wear on the cable. To prevent cable hangup, some prior art systems include a cable storage area in the form of a deep tray underlying each module. All corners of the tray are smoothed and rounded to minimize snarling and wear. This arrangement is not a completely satisfactory one since the deep trays are expensive and require an inordinate amount of shelf volume, thereby reducing the number of modules which may be mounted in a single shelf unit. Moreover, it has been found that the cables tend to wear on the forward edges of the deep tray when the module is completely withdrawn. Although cable wear can be reduced by securing plastic end caps to the deep trays, such a solution increases the cost of the tray arrangement.

The present invention is an inexpensive, easily manufactured cable guide which obviates the need for the expensive deep trays used in certain prior art systems.

SUMMARY OF THE INVENTION

The present invention is a cable guide for use with an electronic equipment module adapted to be removably mounted in a shelf with similar modules. Each module is electrically connected to the remainder of a system through a flexible electrical cable secured to the module and to the shelf. The cable guide is pivotally connected to the shelf for rotation about an axis perpendicular to the direction in which the module may be moved. The guide includes an opening for loosely receiving the cable intermediate its points of securement to the module and the shelf.

DESCRIPTION OF THE DRAWINGS

While the specification concludes with claims particularly pointing out and distinctly claiming that which is regarded as the present invention, details of a preferred embodiment of the invention may be more readily ascertained from the following detailed description when read in conjunction with the accompanying drawings in which:

FIG. 1 is a perspective rear view showing a cable guide in combination with a module and a supporting tray;

FIG. 2 is a perspective view of a preferred embodiment of a cable guide;

FIG. 3 is a side view of a module and tray showing the cable guide in the position assumed with the module partially withdrawn; and FIG. 4 is a side view of the module and tray showing the cable guide in the position assumed with the module fully withdrawn.

DETAILED DESCRIPTION

Referring now to FIG. 1, the present invention is used in combination with modular electronic equipment such as equipment module 10 which is supported by an elongated tray 12. The tray 12 is part of an equipment shelf in which a plurality of the equipment modules may be mounted. Since the shelf structure is not part of the present invention, it is represented only by a partial structural member 14. Because the module 10 rests on the tray 12 without being fastened thereto, the module may be withdrawn from the shelf for servicing purposes simply by sliding it along the tray 12.

The electrical connections between the module 10 and the remainder of the system including the module are made through a flexible cable 16 which terminates at a plug-in connector 18 at the rear of module 10. The cable 16 is secured to the floor of tray 12 by one or more straps 20 between its termination at plug-in connector 18 and its point of exit from the tray 12. Because equipment modules are normally relatively narrow and long, a length of the cable 16 must be free to move to permit complete withdrawal of the module 10 from the shelf. To prevent the cable 16 from hanging up on adjoining equipment modules or from wearing due to contact with adjoining modules or the edges of tray 12, a cable guide 22 is provided for limiting the movement of the free length of cable 16. In a preferred embodiment of the invention, the cable guide 22 is a wire-form member which is mounted at pivot points 24 on the sidewalls of tray 12. The cable guide 22 rotates about an axis 26 which is perpendicular to the length of the tray 12 and thus to the direction in which the module 10 can be moved. The function of the guide 22 is to permit the cable 16 to move freely in forward and reverse directions while preventing the cable from falling toward the sides of tray 12 where it might become hung up on adjoining modules.

Referring now to FIG. 2, the cable guide 22 includes first and second legs 28 and 30, respectively, joined at a bight portion 32. The leg 28 includes a mounting foot 34 at its lower end and a crimped portion 36 between foot 34 and the bight portion 32. The leg 30 similarly includes a mounting foot 38 and a crimped portion 40. The resilience of the wire used in a preferred embodiment of the invention permits the guide to be easily mounted in new trays or modified existing trays. After holes have been drilled in the opposite sidewalls of a tray, the legs 28 and 30 are squeezed together and the cable guide 22 is set into place with the mounting feet 34 and 38 aligned with the drilled holes. Once the legs 28 and 30 are released, the spring action of the wire forces the mounting feet 34 and 38 into the drilled holes, which are slightly larger than the diameter of the wire to permit the cable guide to pivot freely. In a preferred embodiment of the invention, the rigidity of legs 28 and 30 is increased by soldering or otherwise rigidly connecting these legs at crimped sections 36 and 40. For purposes of illustration, a solder point 44 is depicted.

The crimped portions 36 and 40, whether connected or not, and the bight portion 32 of the guide define an opening 42 through which the cable 16 passes. Since the cross-sectional area of the opening 42 is considerably greater than cross-sectional area of the cable 16, the cable moves freely in the direction of module movement, but is restrained from sideways movement.

The bight portion 32 of the cable guide 22 extends at right angles to the plane in which the rest of the cable guide 22 is formed. The reason for this arrangement is best illustrated with reference to FIG. 3. When module 10 is moved toward its fully inserted position, the cable 16 forces the cable guide 22 rearwardly or to the right. When module 10 is fully inserted, the cable 16 forces cable guide 22 to the floor of the tray 12. With the cable guide in this position, the cable 16 rests on the floor of tray 12 at the U-shaped bight portion 32. With the cable 16 spaced from the underside of the module 10, hangups or cable chafing are prevented.

The pivotal movement of the cable guide 22 is illustrated in FIG. 4. In that figure, the cable guide 22 has rotated in a forward direction or to the left due to the pressure of the cable 16 as the module 10 is withdrawn to the left.

While there has been described what is thought to be a preferred embodiment of the present invention, variations and modifications will occur to those skilled in the art once they become familiar with the invention. Therefore, it is contemplated that the appended claims shall be construed to include all such variations and modifications as fall within the true spirit and scope of the invention.

We claim:

1. In combination with an electronic equipment module adapted to be removably mounted in a shelf, an elongated tray secured to such shelf for supporting said module, and a flexible electrical cable secured to said module and said tray, means for limiting cable movement when said module is moved along said tray comprising a cable guide pivotally connected to said tray for rotation about an axis perpendicular to the direction of module movement, said guide defining an opening for loosely receiving the cable intermediate its points of securement to the said module and said tray.

2. The combination recited in claim 1 wherein said guide includes first and second spaced legs connected at a bight portion spaced from the pivotal connection, each of said legs being crimped toward the other at a point intermediate its pivot and the bight portion to define the cable-receiving opening.

3. The combination recited in Claim 2 wherein said guide is a unitary wire-form structure.

4. A cable guide as recited in Claim 2 wherein said first and second legs are rigidly connected to each other at said crimped portions.

* * * * *